(12) United States Patent
Yamanaka et al.

(10) Patent No.: US 7,503,700 B2
(45) Date of Patent: Mar. 17, 2009

(54) BICYCLE BOTTOM BRACKET ASSEMBLY

(75) Inventors: Masahiro Yamanaka, Izumisano (JP); Koshi Tabe, Sakai (JP); Shingo Shiraishi, Sakai (JP)

(73) Assignee: Shimano Inc., Osaka (JP)

( * ) Notice: Subject to any disclaimer, the term of this patent is extended or adjusted under 35 U.S.C. 154(b) by 349 days.

(21) Appl. No.: 11/436,768

(22) Filed: May 19, 2006

(65) Prior Publication Data

US 2007/0095164 A1 May 3, 2007

Related U.S. Application Data

(60) Provisional application No. 60/730,877, filed on Oct. 28, 2005.

(51) Int. Cl.
*F16C 35/06* (2006.01)
(52) U.S. Cl. ...................................... 384/545
(58) Field of Classification Search ................. 384/458, 384/545; 74/594.1; 280/259
See application file for complete search history.

(56) References Cited

U.S. PATENT DOCUMENTS

| | | | |
|---|---|---|---|
| 4,089,540 A | 5/1978 | Liljequist | |
| 4,406,504 A * | 9/1983 | Coenen et al. | 384/545 |
| 4,552,468 A | 11/1985 | Hopper, Jr. | |
| 4,611,933 A * | 9/1986 | Hofmann et al. | 384/458 |
| 6,014,913 A | 1/2000 | Masahiro | |
| 2002/0096015 A1 | 7/2002 | Smith | |
| 2003/0097900 A1 | 5/2003 | Yamanaka | |
| 2004/0162172 A1 | 8/2004 | Yamanaka | |

FOREIGN PATENT DOCUMENTS

| | | |
|---|---|---|
| DE | 3034116 A1 | 3/1982 |
| DE | 3229166 A1 | 2/1984 |
| DE | 3305447 A1 | 8/1984 |
| DE | 3401654 A1 | 8/1985 |
| DE | 8518158 U1 | 2/1987 |
| DE | 29711575 U1 | 9/1997 |
| DE | 29721866 U1 | 4/1998 |
| DE | 29817937 U1 | 10/1998 |
| EP | 1449760 A2 | 8/2004 |
| JP | H08-150978 A | 6/1996 |
| JP | 2004-249770 | 9/2004 |

* cited by examiner

*Primary Examiner*—Thomas R Hannon
(74) *Attorney, Agent, or Firm*—Global IP Counselors, LLP

(57) ABSTRACT

A bicycle bottom bracket assembly is provided with a pair of bearing support members, and a pair of axle bearings so that the bottom bracket assembly is configured and arranged to be mounted into a hanger part of a bicycle frame. The hanger part has opposite open ends. The bearing support members are press-fitted into opposite open ends of the hanger part. The bearings are retained in the bearing support members such that the bearings are disposed inside of the hanger part with outer races of each of the bearings engaging one of the bearing support members. A crank axle is rotatably supported within the hanger part by inner races of the bearings with a first axial end portion of the crank axle being disposed at one end of the hanger part and a second axial end portion of the crank axle being disposed at the other end of the hanger part.

16 Claims, 5 Drawing Sheets

BICYCLE BOTTOM BRACKET ASSEMBLY

CROSS-REFERENCE TO RELATED APPLICATIONS

This application claims the benefit of U.S. Provisional Application No. 60/730,877, filed Oct. 28, 2005. The entire disclosure of U.S. Provisional Application No. 60/730,877 is hereby incorporated herein by reference.

BACKGROUND OF THE INVENTION

1. Field of the Invention

This invention generally relates to a bicycle bottom bracket assembly. More specifically, the present invention relates to a bicycle bottom bracket assembly having bearings located within a cylindrical hanger part or bottom bracket tube of the bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle bottom bracket that is often called a bottom bracket.

Japanese Laid-Open Patent Publication No. 2004-249770 discloses a conventional bottom bracket that is mounted on a hanger part of a bicycle. The conventional bottom bracket is equipped with first and second bearing support members or housings that have first and second bearing retaining sections, respectively. The first and second axle support housings are screwed in to both end portions of the hanger part separately. The conventional crank axle assembly further includes first and second bearings that are stored on the first and second axle support housings. The crank axle is rotatably supported on both of the first and second bearings, and right and left cranks are non-rotatably mounted on the both axial end portions of the crank axle.

In such conventional bottom bracket, the right gear crank is secured on the right axial end portion of the crank axle. The inner rings of the first and second bearings are pressed by inner edge parts of the right and left cranks and disposed so that the right and left cranks can exert pressure to the inner rings of the first and second bearings. The left crank is non-rotatably mounted on the crank axle by a serration that is formed on a circumference surface at the left axial end portion of the crank axle. Moreover, the left crank is fastened to the crank axle by a fastening bolt that is screwed on the left edge inner circumference surface of the crank axle. When the left crank is fastened to the crank axle by the fastening bolt, the right and left cranks press the inner rings of the first and second bearings inwardly in the axial direction by placing the right and left cranks in contact with the outside surfaces of the inner rings of the first and second bearings in the axial direction. In addition, a slit is formed along the radial direction on a crank axle mounting part of the left crank. After fastening the left crank by the fastening bolt, the left crank can be further tightened securely on the crank axle by narrowing the width of the slit by using two mounting bolts. In the conventional bicycle bottom bracket as explained above, by pressing the inner rings of the first and second bearings by using the fastening bolt that secures the left crank, the bearing play is adjusted through the left crank by fastening the left crank to the crank axle. Then, the left crank is further secured onto the crank axle by narrowing the width of the slit of the left crank by the mounting bolts.

However, in this type of conventional bicycle bottom bracket, the bearings are located outside of the cylindrical hanger part or bottom bracket tube of the bicycle frame. As a result, the axial length of the bottom bracket tube of the bicycle frame needs to be made small enough to accommodate the bearings being located outside of the bottom bracket tube of the bicycle frame. Moreover, since the first and second axle support housings are screwed into the bottom bracket tube of the bicycle frame, the first and second axle support housings are made of a metallic material and the ends of the bottom bracket tube are threaded. Thus, this conventional bicycle bottom bracket structure can be heavy and requires threading of the ends of the bottom bracket tube.

In view of the above, it will be apparent to those skilled in the art from this disclosure that there exists a need for an improved bicycle crank axle bearing assembly or bottom bracket. This invention addresses this need in the art as well as other needs, which will become apparent to those skilled in the art from this disclosure.

SUMMARY OF THE INVENTION

One object of the present invention is to provide a bicycle bottom bracket assembly having bearings that are retained in non-metallic bearing support members or housings within the ends of a hanger part of a bicycle frame.

Another object of the present invention is to provide a bicycle bottom bracket assembly that is relatively lightweight.

Another object of the present invention is to provide a bicycle bottom bracket assembly that does not require the ends of the hanger part of the bicycle frame to be threaded.

The forgoing objects can basically be attained by providing a bicycle bottom bracket assembly that includes first and second bearing support members (housings), and first and second bearings so that the bottom bracket assembly is configured and arranged to be mounted into a hanger part of a bicycle frame. The hanger part of a bicycle frame has a first open end and a second open end. The first and second bearing support members are press-fitted into the first and second open ends of the hanger part, respectively. The first and second bearings are retained in the first and second bearing support members, respectively, such that the first and second bearings are disposed inside of the hanger part with outer races of each of the first and second bearings engaging the first and second bearing support members, respectively. A crank axle rotatably is supported within the hanger part by inner races of the first and second bearings with a first axial end portion of the crank axle being disposed at the first open end of the hanger part and a second axial end portion of the crank axle being disposed at the second open end of the hanger part.

In accordance with one aspect of the present invention, the bottom bracket assembly is characterized in that the bearing housing is press-fitted into the cylindrical hanger part so that the bearings are axially positioned inwardly from or flush with the axial ends of the cylindrical hanger part.

In accordance with another aspect of the present invention, the bottom bracket assembly is characterized in that the bearing support members (housings) are made of a non-metallic material (e.g., resin) and are coupled into the cylindrical hanger part in a manner of press-fitting. Thus, such a structure allows the axial length of the cylindrical hanger part to be longer in comparison with the length of the conventional design discussed above, and increases design freedom of parts attached to this area of the bicycle frame. Further, since the bottom bracket assembly of the invention comprises a bearing sandwiched between the bearing housing and the cover member, a user can easily couple the bottom bracket as a unit into the cylindrical hanger part in a press-fitting manner. Preferably, the bearing housing may be made of resin. Such a bearing housing made of resin results in weight-saving and reducing noise during pedaling.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
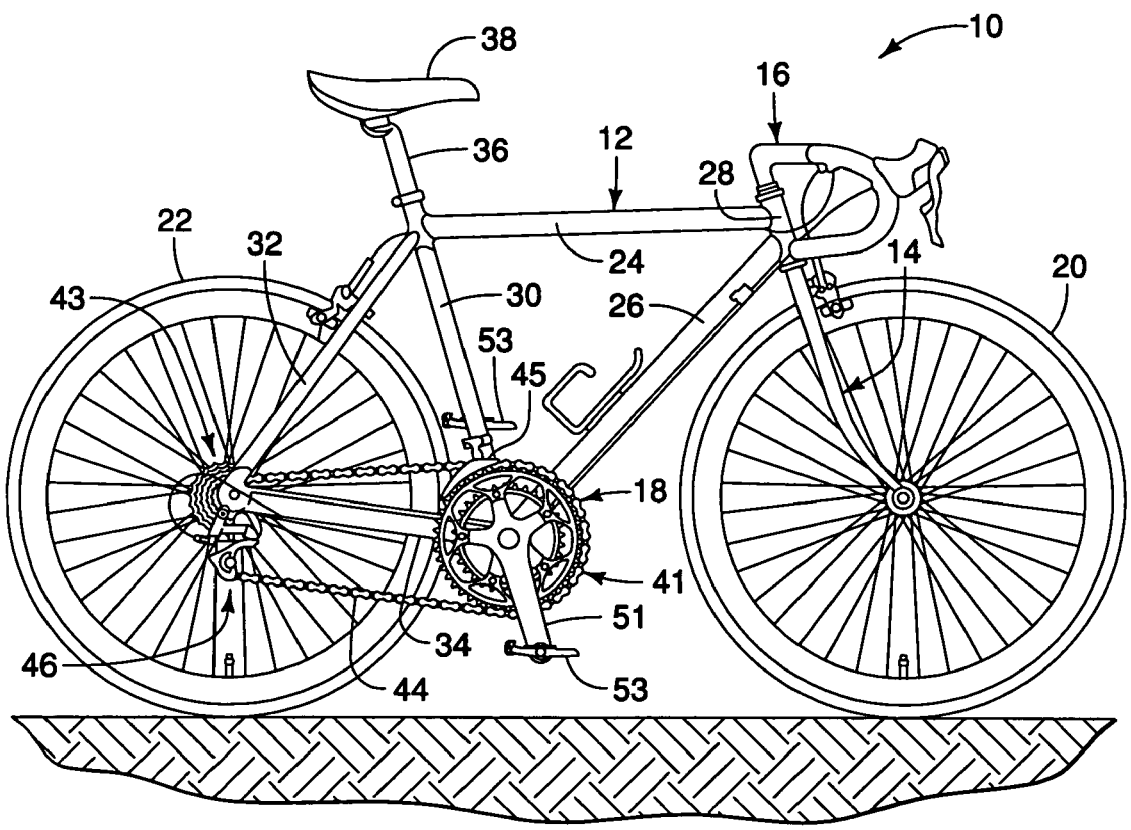
FIG. 1 is an overall right side elevational view of a bicycle with a bicycle bottom bracket assembly in accordance with a first embodiment of the present invention.

Referring initially to FIG. 1, a bicycle 10 is illustrated that is equipped a first embodiment of the present invention. In this example, the bicycle 10 is a road bike that has a diamond-shaped frame 12 with a triangularly shaped front triangle and a triangularly shaped rear triangle that is arranged rearward of the front triangle. The frame 12 serves as the framework of the bicycle body. The frame 12 has a front fork 14 pivotally supported on a front part of the frame 12 such that the front fork 14 can rotate freely about an axis that is tilted slightly from vertical. The lower or bottom part of the front fork 14 is divided into two prongs. The bicycle 10 is also provided with a drop-type handlebar unit 16 connected to the front fork 14, and a drive unit 18 provided on a lower part of the frame 12. The drive unit 18 is configured to convert pedaling force into driving force. A front wheel 20 is supported in a freely rotatable manner on the bottom end of the front fork 14, while a rear wheel 22 is supported in a freely rotatable manner on a rear part of the frame 12. Of course, the bicycle 10 can include other components as needed and/or desired.

The frame 12 is basically formed by a top tube 24, a down tube 26, a head tube 28, a seat tube 30, a pair of seat stays 32 and a pair of chain stays 34. The top tube 24 is arranged generally horizontally, while the down tube 26 is arranged below the top tube 24 such that it slants obliquely upward toward the front. The head tube 28 joins the front ends of the top tube 24 and the down tube 26 together. The seat tube 30 extends diagonally upward and joins the rear ends of the top tube 24 and the down tube 26 together.

The bicycle 10 is also provided with a seat post 36 has a saddle 38 fastened thereto. The seat post 36 is secured in the seat tube 30 such that its position can be vertically adjusted up and down. A cylindrical or tubular hanger part 40 (shown in FIG. 2) is formed at a connection portion where the seat tube 30 and the down tube 26 are joined together.

The drive unit 18 basically includes a front crankset 41, a rear gear cassette unit 43, a chain 44, a front derailleur 45, and a rear derailleur 46. The front crankset 41 is provided on the bottom bracket of the bicycle 10. The rear gear cassette unit 43 is mounted in a non-rotatable manner to the free hub of the rear wheel 22. The chain 44 is arranged on the front crankset 41 and the rear gear cassette unit 43 so as to span therebetween. The front derailleur 45 and the rear derailleur 46 function as gear changing devices.

Figure 2:
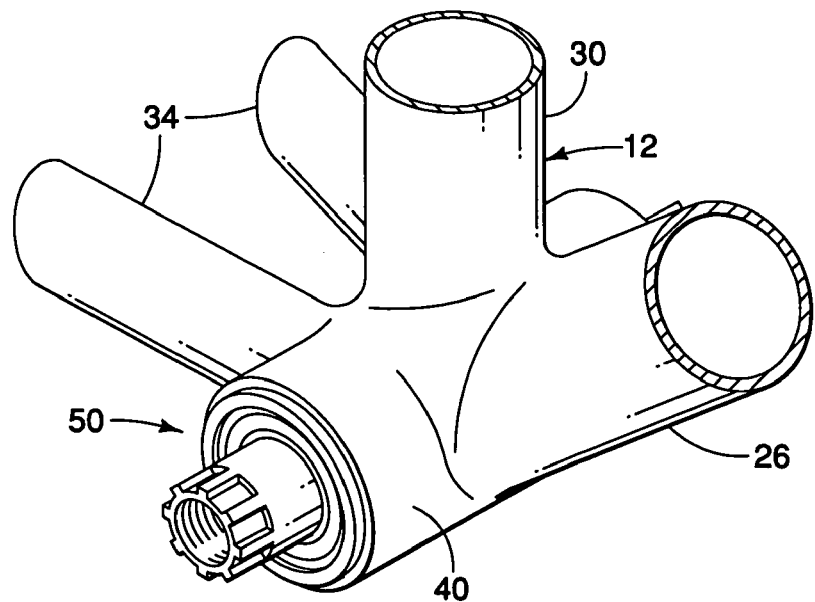
FIG. 2 is an enlarged, partial perspective view of a hanger part of the bicycle frame of the bicycle illustrated FIG. 1 with the bottom bracket installed in the hanger part in accordance with the first embodiment of the present invention.
Figure 3:
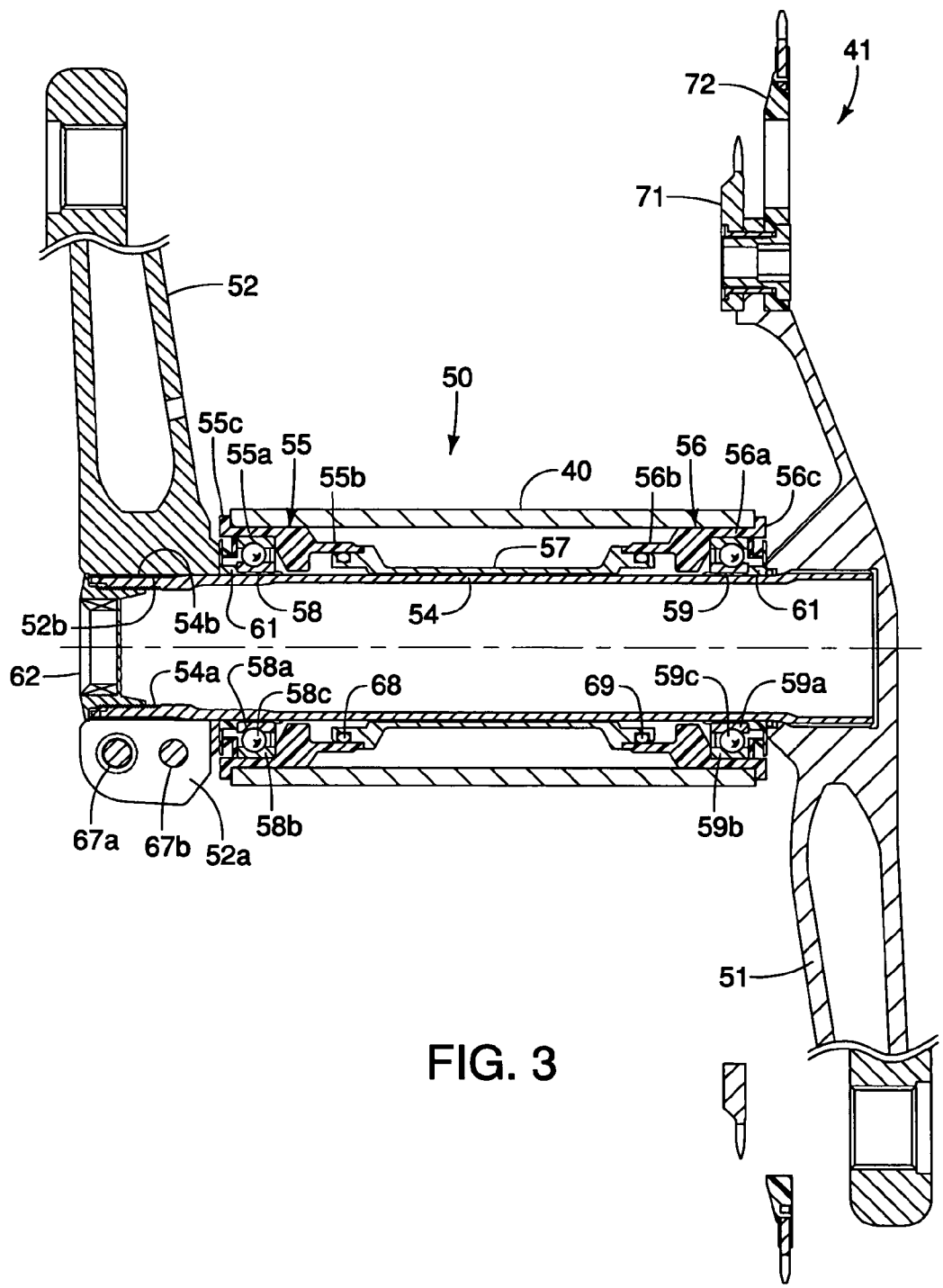
FIG. 3 is a transverse cross sectional view of the bottom bracket assembly in accordance with the first embodiment of the present invention.

As shown in FIGS. 2 and 3, the front crankset 41 basically includes a crank axle assembly or bottom bracket assembly 50, a right crank arm 51, a left crank arm 52, and a pair of pedals 53 (FIG. 1). The bottom bracket assembly 50 preferably has a crank axle 54 rotatably supported on the hanger part 40 of the frame 12 by a pair (left and right) of bearing housings (e.g., the first and second bearing support members) 55 and 56, a tube-shaped connecting member 57, a pair (left and right) of bearings 58 and 59 and a pair (left and right) of cover members 60 and 61. The tube-shaped connecting member 57 concentrically links the left and right bearing housings 55 and 56. The left and right bearings 58 and 59 are mounted on the left and right bearing housings 55 and 56. The left and right cover members 60 and 61 are mounted between the crank axle 54 and the left and right bearings 58 and 59

The right crank arm 51 is preferably fixedly coupled to the right end of the crank axle 54 by an appropriate fixing method such as caulking, bonding or welding so that the right crank arm 51 is integrally coupled to the crank axle 54. The left crank arm 52 is removably fastened to the left end of the crank axle 54. The pedals 53 are mounted to the tip or free ends of the right and left crank arms 51 and 52.

Figure 4:
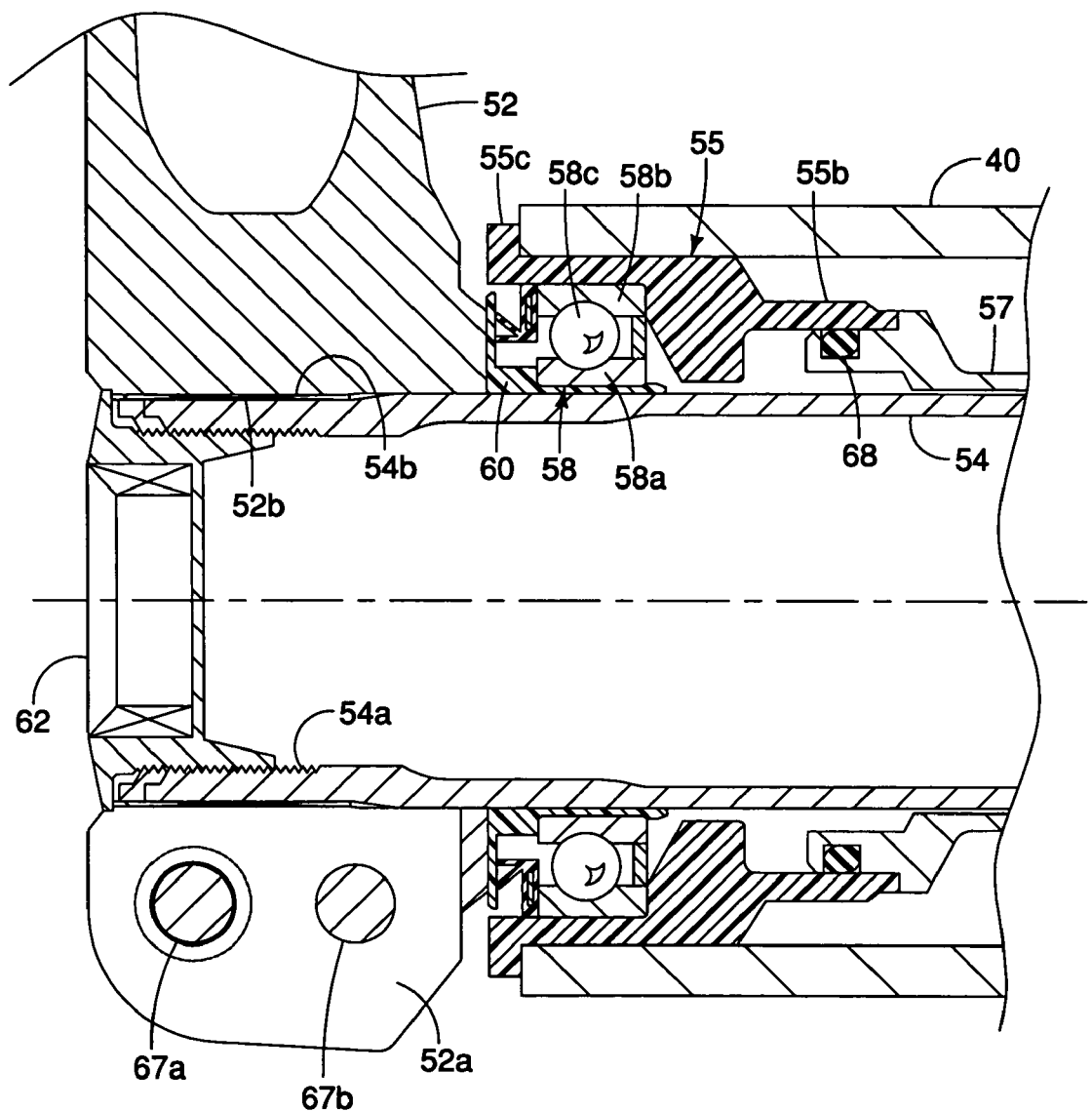
FIG. 4 is an enlarged partial cross sectional view of a left side portion of the bottom bracket assembly in accordance with the first embodiment of the present invention.

The crank axle 54 is preferably an alloy hollow pipe-shaped member that is highly rigid such as chrome molybdenum steel. As shown in FIGS. 3 and 4, the left end portion of the crank axle 54 includes a female (internal threads) screw part 54a and a plurality of external serrations 54b. The female (internal threads) screw part 54a is disposed on an inner circumferential surface of the left end portion of the crank axle 54 so that a fastening bolt 62 is screwed into the female screw part 54a to fasten the left crank arm 52. The serrations 54b is provided on the outer circumferential surface of the left end portion of the crank axle 54 to non-rotatably link the left crank arm 52 thereon.

The bearing housings 55 and 56 are press-fitted into both ends of the hanger part 40. The bearing housings 55 and 56 are preferably formed of a non-metallic material such as, for example, a hard resin material that covers the outer circumference surfaces on the bearings 58 and 59. However, it is possible to form the bearing housings 55 and 56 of a metallic material, such as aluminum, which has properties that allow the bearing housings 55 and 56 to be press-fitted into both ends of the hanger part 40. Accordingly, materials having less hardness than the hanger part 40 can be used for the bearing housings 55 and 56 regardless of whether or not the material is metallic. The bearing housings 55 and 56 are configured and arranged to be press-fitted into the left and right ends of the hanger part 40, respectively.

The left and right bearing housings 55 and 56 are shoulder tube-shaped members that include a pair (left and right) of bearing retaining sections or parts 55a and 56a, respectively, a pair (left and right) of mounting sections or parts 55b and 56b, respectively, and a pair (left and right) of annular abutment sections or parts 55c and 56c, respectively. The bearings 58 and 59 are retained and stored separately in the bearing retaining sections 55a and 56a. The bearing retaining sections 55a and 56a are non-rotatably mounted in the axial end portions of the hanger part 40. The bearing retaining sections 55a and 56a are disposed axially outwardly with respect to the mounting sections 55b and 56b and have a larger maximum diameter than the mounting sections 55b and 56b as seen in FIGS. 3 and 4. The mounting sections 55b and 56b are connected to the ends of the connecting member 57. The annular abutment sections 55c and 56c each form an outer or external abutment surface to define the axial position of the bottom bracket relative to the hanger part 40.

The connecting member 57 is a tubular member that has an inside diameter that the crank axle 54 can penetrate therethrough. The connecting member 57 is coupled to inner edges of the mounting sections 55b and 56b of the left and right bearing housings 55 and 56 at axial ends thereof. Two O rings 68 and 69 are preferably mounted on connecting parts of the connecting member 57 and the bearing housings 55 and 56, respectively as seen in FIG. 3. The connecting member 57 functions as a seal structure for preventing foreign objects such as water, sand, mud or the like from penetrating from outside into the bearings 58 and 59.

The bearings 58 and 59 are preferably ball bearings or roller bearings that include inner rings or races 58a and 59a and outer rings or races 58b and 59b with a plurality of rolling members (i.e. ball bearings) 58c and 59c disposed therebetween. In this embodiment, the left bearing 58 constitutes a first bearing and the right bearing 59 constitutes a second bearing. The bearings 58 and 59 are disposed so that movements of the inner rings 58a and 59a toward outside in the axial direction (the bearing 58 is on the left in FIG. 2, and the bearing 59 is on the right in FIG. 2) is restricted by the left and right crank arms 52 and 51 via the cover members 60 and 61 respectively, and movements of the outer rings 58b and 59b toward the inside in the axial direction (the bearing 63 is on the left in FIG. 2, and the bearing 64 is on the right in FIG. 2) is restricted by the bearing housings 55 and 56, respectively. The bearings 58 and 59 are preferably sealed industrial bearings where seals are mounted between the inner rings 58a and 59a and the outer rings 58b and 59b, respectively, and grease is inserted in the bearings 58 and 59 in advance. Therefore, maintenance of the bearings 58 and 59 for lubrication can be omitted. Accordingly, with the arrangement of the bottom bracket assembly 50 as described above, the axis diameter of the crank axle 54 can be lengthened by placing the bearings 58 and 59 on the outside of the hanger part 40 in the axial direction. Therefore, the weight of the bottom bracket assembly 50 can be reduced by making the crank axle 54 hollow while the strength and rigidity of the crank axle 54 can be maintained at a high level.

The cover members 60 and 61 are, for example, hard resin members that cover the circumference surfaces on the bearing housings 55 and 56. The cover members 60 and 61 are disposed so that the cover members 60 and 61 are sandwiched by the left and right cranks 52 and 51 and the inner rings 58a and 59a of the bearings 58 and 59, respectively.

As seen in FIG. 3, the right crank arm 51 is a gear crank that has a pair of chain rings or sprockets 71 and 72 mounted thereon in a removable manner. The right crank arm 51 is fixedly coupled on the right end of the crank axle 54. An inner edge surface of the right crank arm 51 is disposed to press the bearing 59 via the cover member 61. The left crank arm 52 is also non-rotatably connected on the crank axle 54 in the center portion. In particular, the left crank arm 52 is non-rotatably coupled to the crank axle 54 at a certain rotational phase by serrations formed on the crank axle 54. The bearing 58 is pressed in the axial direction by the left crank arm 52 via the cover member 60. The left crank arm 52 is fixedly coupled to the crank axle 54 by the fastening bolt 62. The bottom bracket assembly 50 is configured and arranged such that the bearings 58 and 59 are pressed axially by the left and right cranks 52 and 51 by screwing the fastening bolt 62. Accordingly, the bearing play of the bearings 58 and 59 can be adjusted. The left crank arm 52 has a slit 52a formed that joins a connecting hole 52b of the left crank arm 52 to mount the crank axle 54. The left crank arm 52 is strongly fixed on the crank axle 54 by tightening up two mounting bolts 67a and 67b that are located on the bottom of the crank axle 54 as seen in FIG. 3. Thus, the slit width of the slit 52a is narrowed by tightening the mounting bolts 67a and 67b that extend across the slit 52a to strongly fix the left crank arm 52 on the crank axle 54. These two mounting bolts 67a and 67b are, for example, hexagon socket head bolts, and their heads are preferably inserted from different directions.

When the bottom bracket assembly 50 of the present invention as described above is mounted on the hanger part 40, first, the bearings 58 and 59 and the cover members 60 and 61 are mounted on the left and right bearing housings 55 and 56. In addition, the connecting member 57 is mounted on one of the bearing housings 55 and 56. In this state, the bearing housings 55 and 56 are press-fitted into the opposite ends of the hanger part 40, respectively.

Next, the gear crank arm 51 to which the crank axle 54 is fixedly coupled is inserted from the side of the bearing housing 56. The left crank arm 52 is mounted on an end of the crank axle 54 that projects axially outwardly from the left bearing housing 55. The left crank arm 52 is mounted with a rotational phase orientation that is offset by 180 degrees from the right crank arm 51.

Then, the fastening bolt 62 is screwed to the female screw part 54a of the crank axle 54, and the left crank 52 is fixed onto the crank axle 54. The crank axle 54 moves toward left in FIG. 3 by tightening up the fastening bolt 62, and the inner edge surfaces of the right and left cranks 51 and 52 place inward pressure on the inner rings 58a and 59a of the bearings 58 and 59 through the cover members 60 and 61.

Accordingly, the bottom bracket assembly of the first embodiment of the present invention is characterized in that the bearing housings 55 and 56 are press-fitted into the hanger part 40 so that the bearings 58 and 59 are positioned axially inwardly from the axial end of the hanger part 40. Moreover, since the bearing housings 55 and 56 are made of resin and are coupled into the hanger part 40 in a manner of press-fitting, such a structure allows the axial length of the hanger part 40 to be longer in comparison with the length of conventional design as disclosed in Japanese Laid-Open Patent Publication No. 2004-249770. Accordingly, it is possible with this structure of the present invention to increase the freedom to design the parts mounted in the area of the cylindrical hanger part 40, e.g. where chain stay (i.e. a part of bicycle frame) should be attached. Further, since the bottom bracket assembly 50 of the present invention has the bearings 58 and 59 sandwiched between the resin bearing housings 55 and 56 and the resin cover members 60 and 61, a user can easily couple the bottom bracket assembly 50 as a pair of units into the hanger part 40 in a press-fitting manner. The bearing housings 55 and 56 being made of resin also results in weight-saving and reducing noise during pedaling.

Second Embodiment

Figure 5:
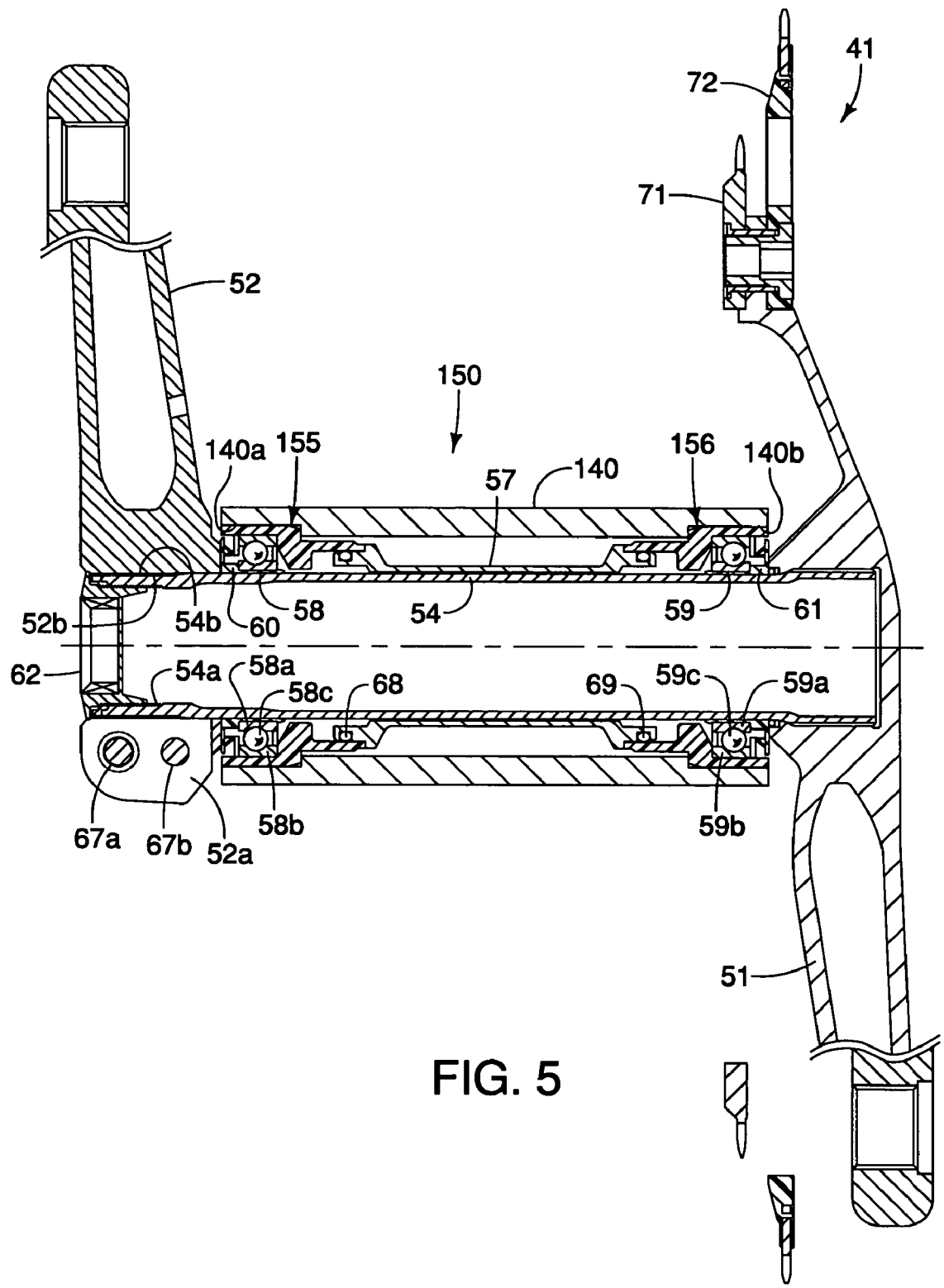
FIG. 5 is a transverse cross sectional view of the bottom bracket assembly in accordance with a second embodiment of the present invention.
Figure 6:
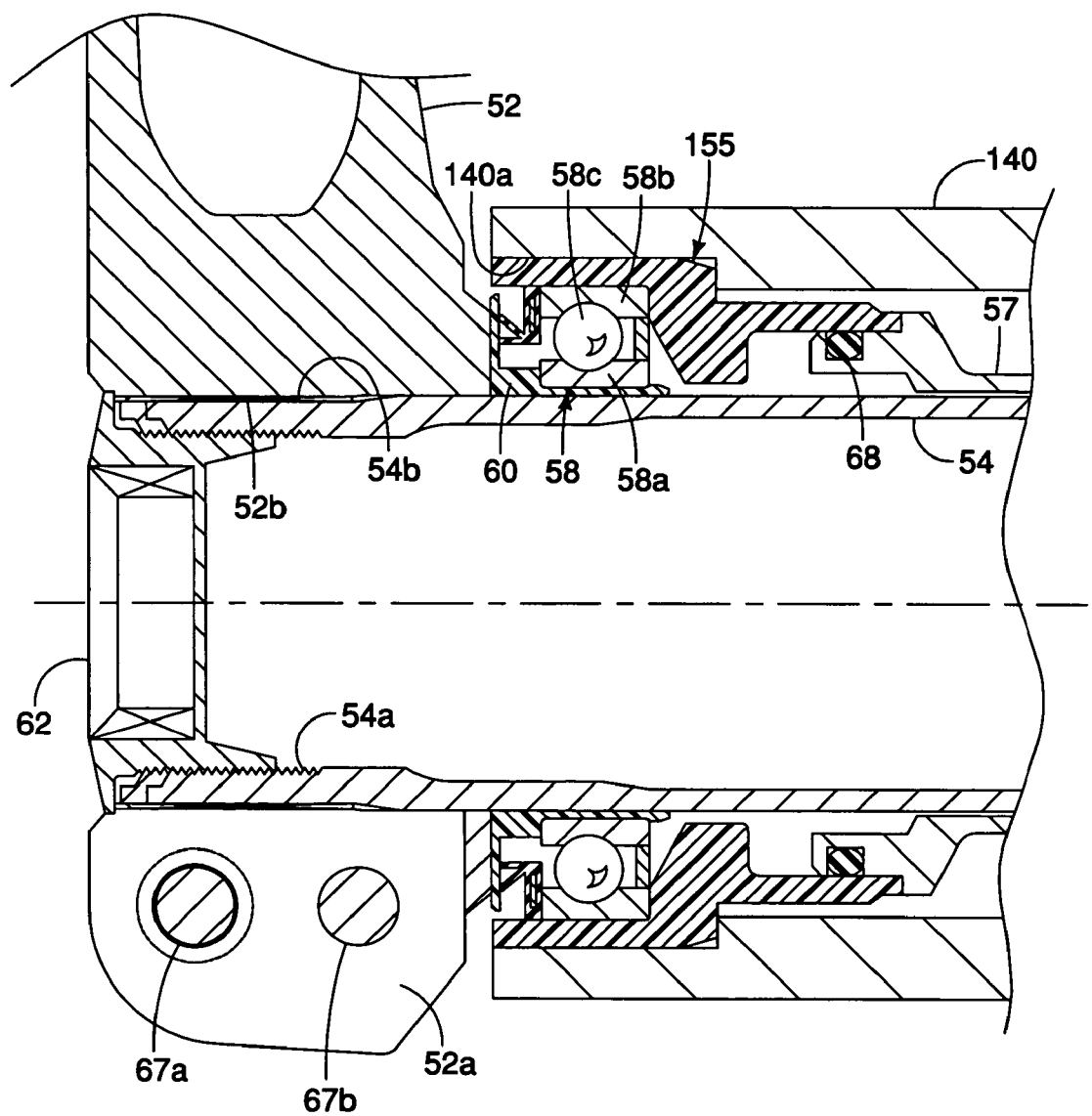
FIG. 6 is an enlarged partial cross sectional view of a left side portion of the bottom bracket assembly in accordance with the second embodiment of the present invention.

Referring now to FIGS. 5 and 6, a bicycle bottom bracket assembly 150 in accordance with a second embodiment will now be explained. The bottom bracket assembly 150 of the second embodiment is identical to the bottom bracket assembly 50 of the first embodiment, except that the bearing housings 55 and 56 of the first embodiment have been replaced with a pair of modified bearing housings 155 and 156 in accordance with the second embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Thus, the bottom bracket assembly 150 includes the crank axle 54 that is rotatably supported on a modified hanger part 140 by the left and right of bearing housings 155 and 156 that supports the tube-shaped connecting member 57 and the bearings 58 and 59 having the cover members 60 and 61 attached thereto. In view of the use of the modified bearing housings 155 and 156, the modified hanger part 140 is preferably used in which opposite ends are provided with an annular recessed portion 140a and 140b. In this second embodiment, the annular abutment sections have been eliminated from the bearing housings 155 and 156. Rather, the bearing housings 155 and 156 have other external abutment parts positioned axially inwardly from the bearings 58 and 59 respectively for engaging internal abutments of the modified hanger part 140 that are formed by the annular recessed portion 140a and 140b of the modified hanger part 140 to define the axial position of the bottom bracket relative to the modified hanger part 140.

As in the prior embodiment, the bearing housings 155 and 156 are also press-fitted into both ends of the modified hanger part 140 in this embodiment. The bearing housings, 155 and 156 are preferably formed of a non-metallic material such as, for example, a hard resin material that covers the outer circumference surfaces on the bearings 58 and 59. However, it is possible to form the bearing housings 155 and 156 of a metallic material, such as aluminum, which has properties that allow the bearing housings 155 and 156 to be press-fitted into both ends of the modified hanger part 140. Accordingly, materials having less hardness than the hanger part 140 can be used for the bearing housings 155 and 156 regardless of whether or not the material is metallic. The bearings 58 and 59 are configured and arranged to be press-fitted into the bearing housings 155 and 156, respectively.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle bottom bracket assembly comprising:

first and second bearing support members with each of the first and second bearing support members having an external abutment part adjacent a non-threaded outer circumferential surface that is configured and arranged to be press-fitted into an open end of a hanger part of a bicycle frame, the first and second bearing support members are constructed of a non-metallic material;

first and second bearings each including an outer race and inner race, the first and second bearings are retained in the first and second bearing support members, respectively, such that the first and second bearings are disposed axially inwardly of the external abutment part of a corresponding one of the first and second bearing support members with the outer races of each of the first and second bearings engaging the first and second bearing support members, respectively;

first and second cover members disposed radially inwardly from the inner races of the first and second bearings, respectively; and a seal member disposed between each of the first and second cover members and an axial facing surface of the outer race of each of the first and second bearings.

2. The bicycle bottom bracket assembly according to claim 1, wherein the inner races of the first and second bearings are configured and arranged to rotatably support a crank axle so that the crank axle is removable from the first and second bearings in an axial direction without removing the first and second bearings from the first and second bearing support members.

3. The bicycle bottom bracket assembly according to claim 1, wherein the first and second bearings are press-fitted into the first and second bearing support members, respectively.

4. The bicycle bottom bracket assembly according to claim 1, wherein the first and second bearing support members are constructed of a non-metallic material.

5. The bicycle bottom bracket assembly according to claim 1, wherein the first and second cover members are configured and arranged so that a crank axle is removable from the first and second cover members in an axial direction without removing the first and second cover members from the inner races of the first and second bearings.

6. The bicycle bottom bracket assembly according to claim 1, wherein
each of the external abutment part is an annular flange.

7. The bicycle bottom bracket assembly according to claim 1, further comprising
a connecting member that concentrically extends between the first and second bearing support members.

8. The bicycle bottom bracket assembly according to claim 1, further comprising
a connecting member that concentrically extends between the first and second bearing support members.

9. A bicycle bottom bracket assembly configured and arranged to be mounted into a hanger part of a bicycle frame having a first open end and a second open end, the bicycle bottom bracket assembly comprising:
first and second bearing support members press-fitted into the first and second open ends of the hanger part, respectively, the first and second bearing support members are constructed of a non-metallic material;
first and second bearings each comprising an outer race, an inner race and a plurality of rolling members disposed between the outer and inner races, the first and second bearings being retained in the first and second bearing support members, respectively, such that the first and second bearings are disposed inside of the hanger part with the outer races of each of the first and second bearings engaging the first and second bearing support members, respectively;
first and second cover members disposed radially inwardly from the inner races of the first and second bearings, respectively; and
a seal member disposed between each of the first and second cover members and an axial facing surface of the outer race of each of the first and second bearings.

10. The bicycle bottom bracket assembly according to claim 9, wherein
the inner races of the first and second bearings are configured and arranged to rotatably support a crank axle so that the crank axle is removable from the first and second bearings in an axial direction without removing the first and second bearings from the hanger part.

11. The bicycle bottom bracket assembly according to claim 9, wherein
the first and second bearings are press-fitted into the first and second bearing support members.

12. The bicycle bottom bracket assembly according to claim 9, wherein
the first and second bearing support members are constructed of a non-metallic material.

13. The bicycle bottom bracket assembly according to claim 9, wherein
the first and second cover members are configured and arranged relative to a crank axle so that the crank axle is removable from the first and second cover members in an axial direction without removing the first and second cover members from the hanger part.

14. The bicycle bottom bracket assembly according to claim 9, wherein
each of the first and second bearing support members has an external abutment part that are configured arranged to contact an axial edge of the first and second open ends of the hanger part, respectively, to limit inward axial movement of the first and second bearing support members.

15. The bicycle bottom bracket assembly according to claim 9, wherein
each of the first and second bearing support members has an external abutment part that are configured arranged to contact an internal abutment part formed on the inner surface of the hanger part, respectively, to limit inward axial movement of the first and second bearing support members.

16. The bicycle bottom bracket assembly according to claim 9, further comprising
a connecting member that concentrically extends between the first and second bearing support members.

* * * * *